United States Patent [19]
Ali et al.

[11] Patent Number: 5,320,915
[45] Date of Patent: Jun. 14, 1994

[54] GLASS SEALING OF ELECTROCHEMICAL STORAGE CELL STRUCTURES

[75] Inventors: Mir A. Ali, Lomita; Clark A. Saito, Cerritos, both of Calif.

[73] Assignee: Hughes Aircraft Company, Los Angeles, Calif.

[21] Appl. No.: 988,995

[22] Filed: Dec. 11, 1992

[51] Int. Cl.$^5$ .......................................... H01M 10/39
[52] U.S. Cl. ................................. 429/104; 429/193; 429/185
[58] Field of Search ................ 429/104, 191, 193, 185

[56] References Cited

U.S. PATENT DOCUMENTS

| | | | |
|---|---|---|---|
| 3,765,945 | 10/1973 | Sudworth | 136/83 R |
| 3,783,024 | 1/1974 | Gibson et al. | 136/6 A |
| 4,894,299 | 1/1990 | Morse | 429/104 |
| 5,053,294 | 10/1991 | Sernka et al. | 429/104 |

*Primary Examiner*—Anthony Skapars
*Attorney, Agent, or Firm*—E. E. Leitereg; T. Gudmestad; W. K. Denson-Low

[57] ABSTRACT

An electrochemical storage cell (20) includes a ceramic housing frame (22) with a flat plate solid ceramic electrolyte (32) bonded to a internal shoulder (26) of the housing frame (22) with a glassy seal (33). A metallic weld ring (34) is bonded to each end of the housing frame (22). Each weld ring (34) has a welding flange (36) disposed parallel to a respective end of the housing frame (22) and also has a bonding flange (40). The bonding flange (40) lies parallel and adjacent to an internal surface (24) of the housing frame (22) if the coefficient of thermal expansion of the weld ring (34) is less than that of the housing frame (22), and parallel and adjacent to an external surface (28) of the housing frame (22) if the coefficient of thermal expansion of the weld ring (34) is greater than that of the housing frame (22). A glassy seal (42) is formed between the bonding flange (40) of each weld ring (34) and the respective adjacent surface (24 or 28) of the housing frame (22). The glassy seals (33 and 42) are formed by heating an assembly of the components to the glass transition temperature of the glassy seal material to effect bonding and then slowly cooling to minimize thermal stresses.

7 Claims, 3 Drawing Sheets

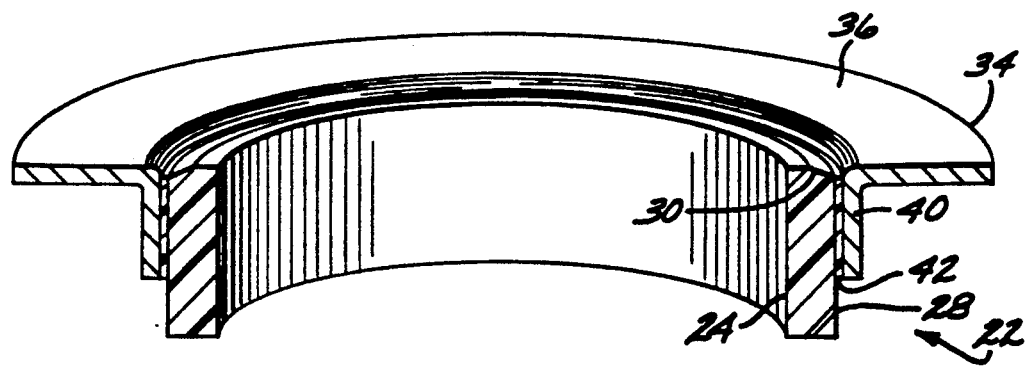
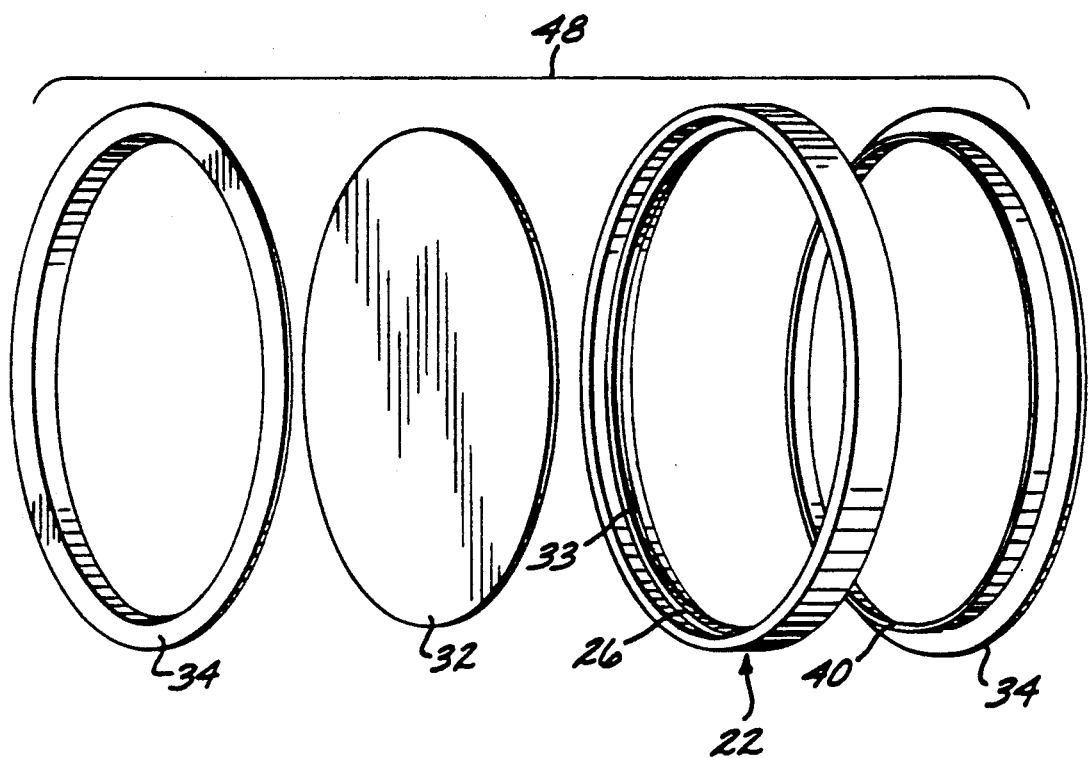

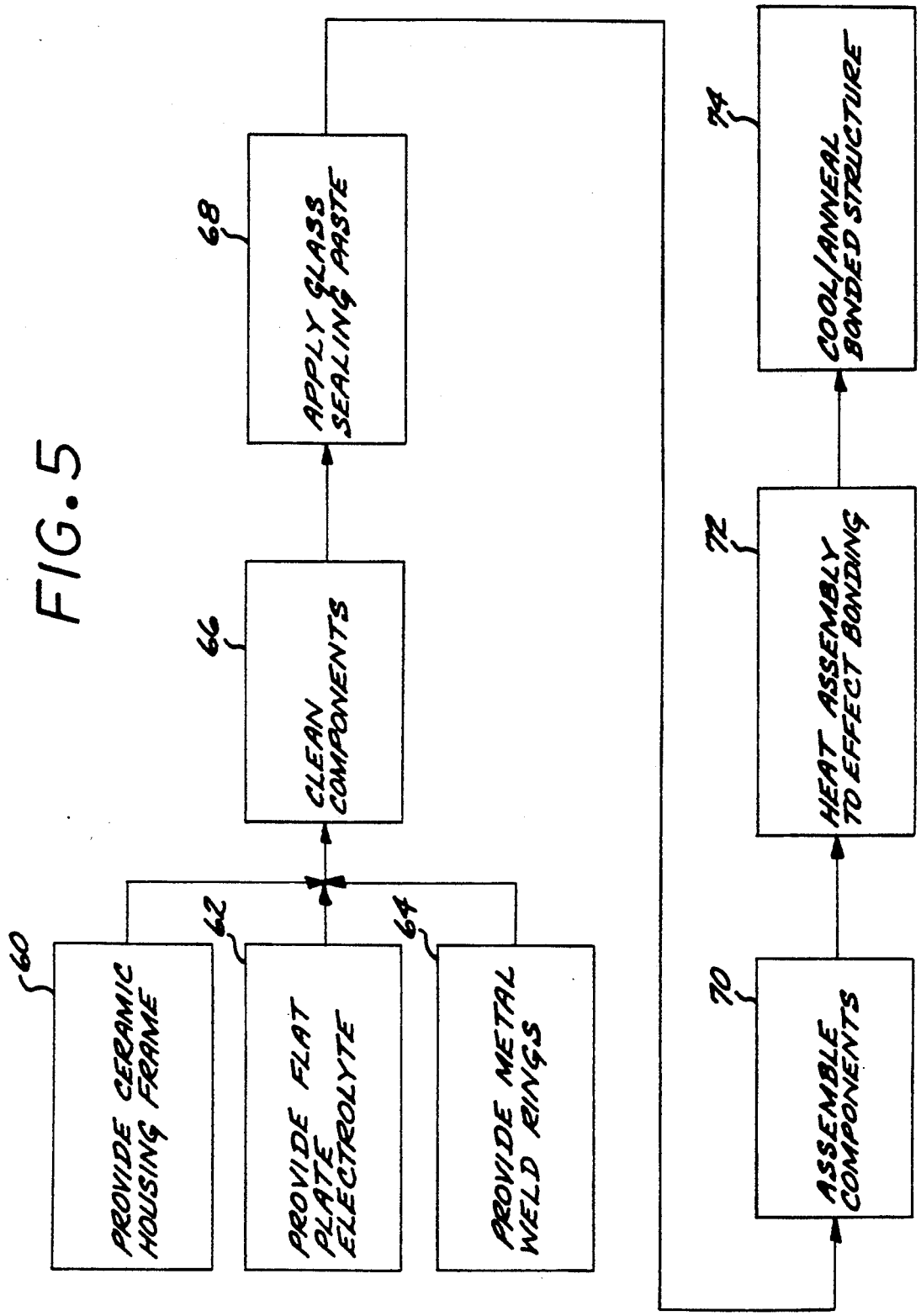

GLASS SEALING OF ELECTROCHEMICAL STORAGE CELL STRUCTURES

This invention was made with Government support under Contract No. F33615-89-C-2911 awarded by the Department of the Air Force. The Government has certain rights in this invention.

BACKGROUND OF THE INVENTION

This invention relates to the production of sealed electrochemical storage cells, and, more particularly, to the glass sealing of such cells.

Rechargeable cells are electrochemical devices for storing and retaining an electrical charge and later delivering that charge as useful power. A number of such cells are usually connected together to form a battery having specific voltage or current delivery capability. Each cell includes an anode, a cathode, and an electrolyte separating the anode and the cathode. The most familiar types of electrochemical cells utilize a solid anode and a solid cathode, with a liquid electrolyte.

In another type of electrochemical cell, the anode and cathode are liquids, and the electrolyte is a solid ceramic material. One such electrochemical cell is the sodium-sulfur cell, which has a sodium anode, a sulfur cathode, and a solid electrolyte of beta double prime (Beta") aluminum oxide (alumina). Beta double prime aluminum oxide is formed from aluminum oxide, sodium oxide, and sometimes other oxides such as lithium oxide and magnesium oxide. The presence of the sodium permits sodium ion charge carriers to diffuse through the solid electrolyte at elevated temperatures during battery charging and discharging cycles.

Sodium-sulfur electrochemical storage cells can store several times as much charge per unit weight of cell than other high-performance rechargeable cells such as nickel-hydrogen cells. Sodium-sulfur electrochemical storage cells are therefore candidates for energy storage in both terrestrial and space applications. On earth, such storage cells may be used in electrically powered automobiles. In space, the sodium-sulfur cell may be used in satellites and other types of spacecraft.

The most common construction for a sodium-sulfur electrochemical storage cell is a tubular configuration. A tube of the Beta" electrolyte material is mounted within a larger cylindrical outer housing. Sodium is placed within the tube of electrolyte material, and sulfur is placed in the annular space between the electrolyte tube and the outer housing. Electrical connections are made at the ends of the cell, and the cell is heated to about 350 C. in service.

More recently, Beta" alumina flat-plate sodium-sulfur cells have been developed. The flat-plate cells utilize a flat piece of the Beta" electrolyte material separating a sodium anode and a sulfur cathode. The flat-plate cells have the advantage that the active area of electrolyte per unit weight of cell is larger than for corresponding tubular cells. Such flat-plate cells are discussed in U.S. Pat. Nos. 3,765,945, 3,783,024, and 5,053,294, for example.

One of the challenges in the fabrication of flat-plate cells is achieving dependable, long-life seals of the various components to each other. The cell must not leak molten sodium or sulfur out of their respective compartments, or permit external contaminants to intrude into the cell during operation at a temperature that is ordinarily about 350 C. Moreover, the cell is subjected to a range of temperatures during its operating life, and the thermal cycling between different temperatures can lead to failure of the seals as a result of the difference in the coefficients of thermal expansion, corrosion resistance, and mechanical properties of the components facing each other at the seal. Metals can be readily joined to each other as by welding, but it is often difficult to reliably seal ceramics to other ceramics, or ceramics to metals, because of the differences in properties.

For example, in FIG. 3 of U.S. Pat. No. 5,053,294, the ceramic/ceramic seal of the ceramic electrolyte to an internal shoulder of the ceramic container is indicated at numeral 18. At another location, metal weld rings are used to attach the end plates to the remainder of the cell. The metal weld rings must be attached to the ceramic container with a metal/ceramic seal, indicated at numeral 42 of the '294 patent.

Operable sealing structures and methods are disclosed in the '294 patent. Nevertheless, there is always a need for improved sealing procedures that are less complex, more reliable, and result in seals that are less subject to failure during the extended service life of the storage cell. The present invention fulfills this need, and further provides related advantages.

SUMMARY OF THE INVENTION

The present invention provides an electrochemical storage cell base structure of ceramic housing frame, solid electrolyte, and weld rings that are joined together into a single integral unit. This unit is thereafter loaded with the sodium anode and sulfur cathode, the end plates are welded in place, and the storage cell is ready for use. The latter steps are relatively straightforward, and the key to the reliability of the storage cell is the fabrication of the base structure. In the present approach, the base structure utilizes an arrangement of elements and a fabrication procedure that minimize adverse effects of the fabrication procedures themselves and of the operating conditions of the cell over extended periods of time. The approach of the invention is also less expensive to accomplish than prior procedures.

In accordance with the invention, an electrochemical storage cell base structure comprises a ceramic housing frame having an internal surface, an internal shoulder in the internal surface, an external surface, and two opposed ends. A flat plate solid ceramic electrolyte is bonded to the shoulder with a glassy seal. A metallic weld ring is bonded to each end of the housing frame, each weld ring having a welding flange disposed parallel to the respective end of the housing frame and a bonding flange. The bonding flange lies parallel and adjacent to the internal surface of the housing frame if the coefficient of thermal expansion of the weld ring is less than that of the housing frame, and lies parallel and adjacent to the external surface of the housing frame if the coefficient of thermal expansion of the weld ring is greater than that of the housing frame. A glassy seal is made between the bonding flange of each weld ring and the respective adjacent surface of the housing frame.

The invention also provides a process for producing the base structure. In this process, the above-described housing frame, ceramic electrolyte, and weld rings are assembled. Layers of glassy seal material are placed between the electrolyte and the internal shoulder of the housing frame, and between the bonding flange of the weld ring and the respective surface of the housing frame. This assembly is heated to the glass transition temperature of the glassy material that acts as a seal between the bonding flange and the housing frame, and held at that temperature to permit wetting and bonding of the glassy seal materials. The assembly is slowly cooled to ambient temperature, preferably with at least one intermediate pause to permit intermediate-temperature annealing of the glassy seals. The result of the selected structure and the processing is an integral unit with stable, reliable seals.

The present invention is most preferably used with a sodium-sulfur storage cell of the type disclosed in U.S. Pat. No. 5,053,294, whose disclosure is incorporated by reference. This storage is of the flat-plate type, with a cylindrically symmetric housing frame. In this embodiment, the housing frame is made of alpha aluminum oxide, the electrolyte is made of beta double prime aluminum oxide, and the weld rings are made of a molybdenum-based alloy or an iron-based alloy having thermal expansion coefficients relatively close to that of alpha aluminum oxide.

The present approach provides an advance in the art of fabrication of storage cells requiring metal/ceramic and ceramic/ceramic glassy seals. The design of the bonding flange of the weld rings relative to the housing frame ensures that the ceramic/metal seal between each weld ring and the housing frame will be in compression rather than tension during service, reducing the likelihood of failure. The sealing of the electrolyte to the housing frame and of the two weld rings to the housing frame is accomplished in a single heating operation, avoiding the adverse effects of multiple heating and sealing operations found in some of the art. The heating to the glass transition temperature accomplishes sealing at the minimum possible temperature, and in combination with the slow cooling and intermediate annealing results in minimal internal stresses within the seal. These factors all combine to ensure optimal performance of the seals of the storage cell.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a perspective view of a sectioned second seal configuration for the weld ring to the housing frame;

FIG. 4 is an exploded view of the assembly of the storage cell base structure; and FIG. 5 is a process flow block diagram for the preparation of the storage cell base structure.

DETAILED DESCRIPTION OF THE INVENTION

Figure 1:
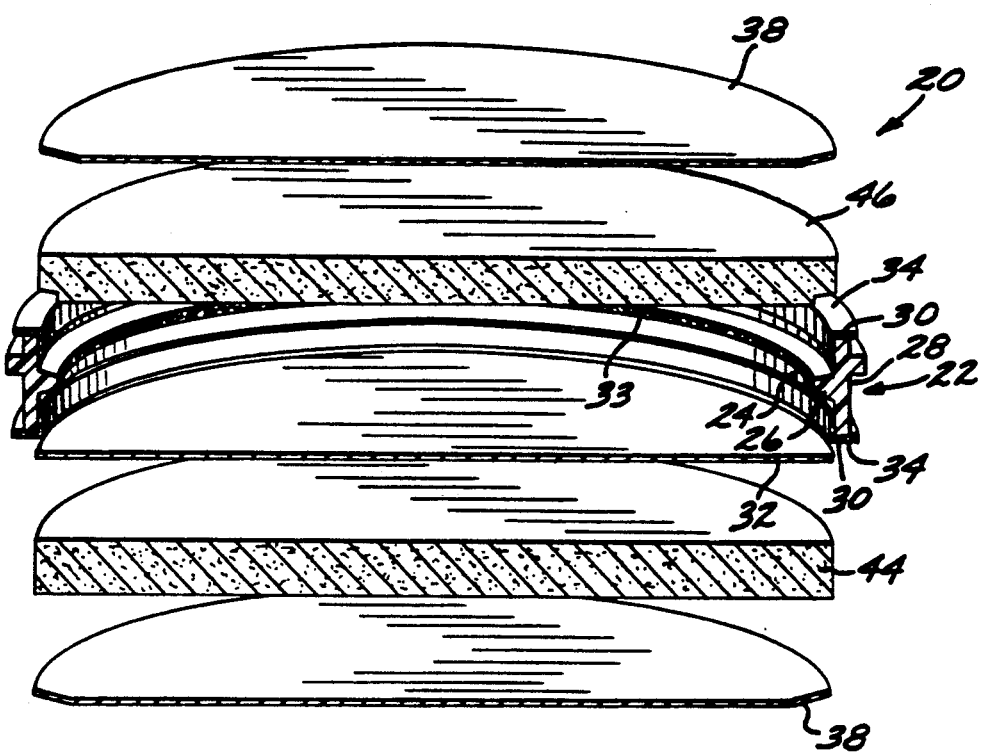
FIG. 1 is an exploded perspective view of a sectioned sodium-sulfur electrochemical storage cell.

FIG. 1 depicts the structure of an electrochemical storage cell 20. Except for the sealing structures and techniques, the storage cell 20 is similar to that disclosed in U.S. Pat. No. 5,053,294, and complete details of materials and constructions may be found there. Only the portions relevant to the present invention will be discussed here.

The storage cell 20 is generally of a flat, disk-like configuration. It includes a cylindrically symmetric housing frame 22, which is preferably made of alpha aluminum oxide. The housing frame 22 has an internal surface 24, an internal shoulder 26 in the internal surface 24, an external surface 28, and opposing ends 30.

A flat plate solid electrolyte 32 is dimensioned to fit within the circumference of the housing frame 22 and to seat against one side of the internal shoulder 26. The electrolyte is preferably made of beta double prime (Beta″) aluminum oxide (alumina). It is typically from about 0.015 to 0.040 inches thick. The electrolyte 32 is bonded to the shoulder 26 with a first glassy seal 33.

Two metallic weld rings 34 are provided, one fitted to each end 30 of the housing frame 22. The details of weld ring structure and bonding depend upon the relative properties of the weld ring 34 and the housing frame 22, and are depicted in greater detail in FIGS. 2 and 3. Each weld ring 34 is generally of an L-shape when viewed in section. One leg of the L is a welding flange 36 disposed parallel to the end 30 of the housing frame 22. At final assembly of the storage cell 20, a metallic end plate 38 is welded to each of the welding flanges 36.

The other leg of the L is a bonding flange 40 which lies parallel and adjacent to either the internal surface 24 or the external surface 28 of the housing frame 22. The bonding flange 40 is bonded to the respective surface 24 or 28 by a second glassy seal 42. In each case, the load-bearing path through the seal 42 is in a radial direction rather than an axial direction. Thus, axial forces along the length of the storage cell 20 are transmitted through the seal 42 in shear loading rather than axial loading. Low-ductility materials such as glasses are more reliable when loaded in shear than tension, and the sealing approach of the invention therefore improves the reliability of the storage cell.

The determination of whether the weld ring is dimensioned such that the bonding flange 40 is adjacent to the internal surface 24 (FIG. 2) or the external surface 28 (FIG. 3) is made from a comparison of the thermal expansion properties of the weld ring 34 and the housing frame 22. The objective of the placement of the bonding flange 40 relative to the housing frame 22 is that, after cooling from elevated temperature to a reduced temperature, the seal 42 is in compression rather than tension. A glassy material generally has rather low ductility, and performs mechanically much better in compression than in tension. The relative circumferential contraction and geometric placement of the weld ring 34 and the housing frame 22 during cooling determine whether the seal 42 is in tension (undesirable) or compression (desirable).

Figure 2:
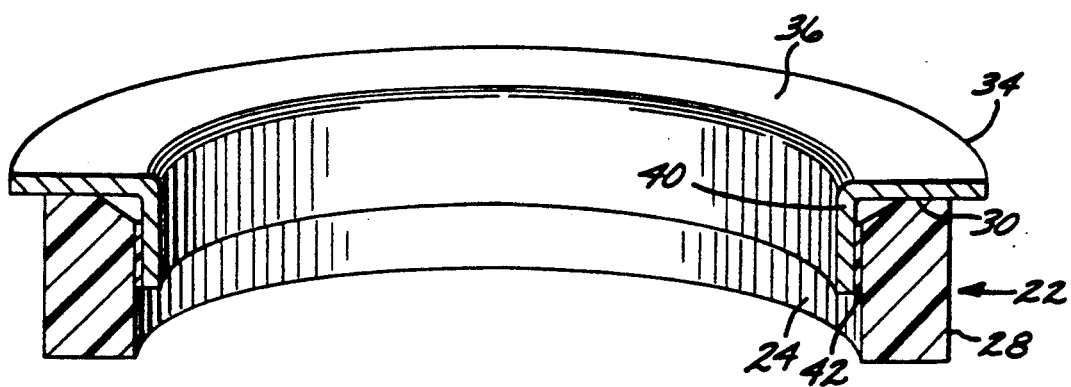
FIG. 2 is a perspective view of a sectioned first seal configuration for the weld ring to the housing frame.

To ensure that the seal 42 is in compression after cooling, the bonding flange 40 is placed inside the housing frame 22 and adjacent the internal surface 24 if the coefficient of thermal expansion of the weld ring 34 is less than that of the housing frame 22, FIG. 2. If there is neutral stress in the seal 42 at high temperature, the greater contraction of the housing frame 22 than the weld ring 34 during cooling will place the seal 42 in compression at a lower temperature. Consequently, the seal 42 is less likely to crack during subsequent loading and temperature changes.

In the other case, the bonding flange 40 is placed outside the housing frame 22 and adjacent the external surface 28 if the coefficient of thermal expansion of the weld ring 34 is greater than that of the housing frame 22, FIG. 3. If there is neutral stress in the seal 42 at high temperature, the greater contraction of the weld ring 34 than the housing frame 22 during cooling will place the seal 42 in compression at a lower temperature. Again, the seal 42 in compression loading is less likely to crack than a seal in tension or neutral loading.

Returning to FIG. 1, the storage cell 20 is completed by filling one of the compartments created between the end plate 38 and the electrolyte 32 with an anode 44, in this case sodium. The anode compartment is typically filled with a porous solid structure and the sodium is infiltrated into the porous anode structure. The other compartment between the other end plate 38 and the electrolyte 32 is filled with a cathode 46, in this case sulfur. Similarly, the cathode compartment is usually filled with a porous solid structure and the sulfur is infiltrated into the porous cathode structure. Details of anode and cathode design are not within the scope of the present invention, which is concerned with the glass sealing structures and procedures. The present invention is operable with any of the anode and cathode designs, with the preferred designs being those set forth in U.S. Pat. No. 5,053,294.

A storage cell base structure 48 is formed by bonding the housing frame 22, electrolyte 32, and the two weld rings 34 into a single structure, which is shown in exploded view in FIG. 4 during assembly. FIG. 5 is a process flow diagram for the procedure for fabricating such a base structure 48.

Referring to FIGS. 4 and 5, the fabrication process begins by providing the ceramic housing frame 22, numeral 60, the flat plate electrolyte 32, numeral 62, and the two weld rings 34, numeral 64. These components are dimensioned to fit together in the manner discussed previously. The diameter of the bonding flange 40 of the weld ring 34 is determined according to the principles discussed earlier as applied to the selected materials of construction of the weld ring 34 and the housing frame 22. If the coefficient of thermal expansion of the weld ring is less than that of the housing frame, the bonding flange 40 is made with a diameter such that it is adjacent to the internal surface 24. If the coefficient of thermal expansion of the weld ring is greater than that of the housing frame, the bonding flange 40 is made with a diameter such that it is adjacent to the external surface 28.

The components 22, 32, and 34 are carefully cleaned, preferably by washing and then degreasing in Freon TF, followed by ultrasonic degreasing in Freon TF, numeral 66. Glass sealing material is applied to the shoulder 26 and the appropriate portion of the internal or external surface of the housing frame 22, numeral 68. The first seal 33 and the second seal 42 may be made of different glasses, but are preferably of the same glass. The preferred form of the glass sealing material is a paste of fine (e.g., −325 mesh) glass particles in deionized water. The glass may be of any operable sealing composition, but preferably has a composition in weight percent of about 19 percent aluminum oxide, 45 percent boron oxide, 6 percent calcium oxide, 12 percent barium oxide, 10 percent strontium oxide, and 8 percent silicon dioxide.

The components 22, 32, and 34 are assembled in the manner shown in FIG. 4, numeral 70. Additional glass paste may be added as necessary. In making the assembly, tooling and spacers are normally provided to ensure the proper positioning of the components both during assembly and during subsequent heating and bonding.

The assembly of components 22, 32, and 34 is heated to elevated temperature to soften the glassy sealing material and effect bonding, numeral 72. The higher the temperature during bonding, the greater the potential for residual stresses after cooling. The assembly is therefore preferably heated to no higher a temperature than necessary, which is the glass transition temperature of the glassy material. At this temperature, the viscosity of the glass is on the order of $10^{14.5}$ Pascals. In the case of the preferred glassy sealing material, the assembly is heated to a temperature of about 800 C. for about 15 minutes.

After bonding, the bonded assembly of components 22, 32, and 34 is slowly cooled, numeral 74, to permit residual stresses in the seals 33 and 42 to be removed to the maximum extent possible during the cooling procedure. It is preferred to cool at a rate of about 100 C. per hour. It is also preferred to discontinue the continuous cooling and hold the assembly at a constant temperature to anneal the structure at an intermediate temperature. In this case, the preferred annealing is accomplished at a temperature of 600 C. for 1 hour.

After the base structure 48 is fabricated by this procedure, the anode 44 and cathode 46 are loaded into the base structure. The end plates 38 are welded to the welding flange 36 of each weld ring 34, and the storage cell 20 is complete except for external electrical connections.

A large number of materials are available for the fabrication of the weld rings 34. Calculations have determined that, of the various materials available, the ones yielding the greatest degree of compatibility with the alpha aluminum oxide housing frame 22 are molybdenum-based alloys and iron-based alloys. The molybdenum-based alloys, and in particular the preferred alloy TZM having a composition in weight percent of 0.5 percent titanium, 0.08 percent zirconium, 0.15 percent carbon, balance molybdenum, have a thermal expansion coefficient closest to but less than that of alpha aluminum oxide, and are therefore preferred for the seal configuration of FIG. 2. The iron-based alloys, and in particular the preferred alloy kovar having a composition in weight percent of about 54 percent iron, 28 percent nickel, and 18 percent cobalt, have a thermal expansion coefficient closest to but greater than that of alpha aluminum oxide, and are therefore preferred for the seal configuration of FIG. 3.

Tests were performed of the viability of the ceramic-to-metal seals for both alpha and Beta" alumina to TZM molybdenum and kovar alloy, using the preferred glass sealing material and procedure discussed previously. The overall fabrication approach was also demonstrated.

In a first test, lap shear specimens of alpha alumina to TZM molybdenum were prepared and tested. These specimens had shear strengths of about 5,000 pounds per square inch, which are satisfactory for the present approach and are in accordance with predictions.

In a second test, arc-shaped pieces of TZM molybdenum were glass sealed to similarly shaped arcs of alpha alumina housing frame and flat pieces of Beta" alumina electrolyte material, to simulate the glass-sealed region of the cell structure. These bonded structures were thermally tested by cycling them five times between 22 C. and 350 C. The structures cycled successfully and did not fail, indicating their satisfactory performance during the thermal cycling required for cell and battery structures of this type.

In a third test, the second test was repeated except that kovar alloy was used instead of the TZM molybdenum. The pieces were similarly tested, and similar acceptable results were observed.

In a fourth test, a demonstration base structure was successfully prepared according to the approach discussed herein. The weld rings were made of TZM molybdenum in the configuration of FIGS. 1 and 2, and the procedure of FIG. 5 was followed.

Although a particular embodiment of the invention has been described in detail for purposes of illustration, various modifications may be made without departing from the spirit and scope of the invention. Accordingly, the invention is not to be limited except as by the appended claims.

What is claimed is:

1. An electrochemical storage cell base structure, comprising:
    a ceramic housing frame having an internal surface, an internal shoulder in the internal surface, an external surface, and two opposed ends;
    a flat plate solid ceramic electrolyte bonded to the shoulder with a glassy seal;
    a metallic weld ring bonded to each end of the housing frame, each weld ring having a welding flange disposed parallel to the respective end of the housing frame and a bonding flange,
    the bonding flange lying parallel and adjacent to the internal surface of the housing frame if the coefficient of thermal expansion of the weld ring is less than that of the housing frame, and
    the bonding flange lying parallel and adjacent to the external surface of the housing frame if the coefficient of thermal expansion of the weld ring is greater than that of the housing frame; and
    a glassy seal between the bonding flange of each weld ring and the respective adjacent surface of the housing frame.

2. The base structure of claim 1, wherein the housing frame is made of alpha aluminum oxide.

3. The base structure of claim 1, wherein the solid ceramic electrolyte is beta double prime aluminum oxide.

4. The base structure of claim 1, wherein the weld ring is made of a molybdenum alloy, and the bonding flange lies parallel and adjacent to the internal surface of the housing frame.

5. The base structure of claim 1, wherein the weld ring is made of an iron alloy, and the bonding flange lies parallel and adjacent to the external surface of the housing frame.

6. The base structure of claim 1, wherein the housing frame is cylindrically symmetric.

7. An electrochemical storage cell base structure, comprising:
    a cylindrically symmetric ceramic housing frame having an internal surface, an internal shoulder in the internal surface, an external surface, and two opposed ends;
    a beta double prime aluminum oxide flat plate electrolyte bonded to the shoulder with a glassy seal;
    a metallic weld ring bonded to each end of the housing frame, the weld rings being made of a material selected from the group consisting of an iron-based alloy and a molybdenum-based alloy, each weld ring having a welding flange disposed parallel to the respective end of the housing frame and a bonding flange,
    the bonding flange lying parallel and adjacent to the internal surface of the housing frame in the case of a molybdenum-based alloy, and
    the bonding flange lying parallel and adjacent to the external surface of the housing frame in the case of an iron-based alloy; and
    a glassy seal between the bonding flange of each weld ring and the respective adjacent surface of the housing frame.

* * * * *